United States Patent
Heiskanen et al.

(10) Patent No.: US 12,152,345 B2
(45) Date of Patent: Nov. 26, 2024

(54) METHOD FOR THE PRODUCTION OF A COATED PAPER, PAPERBOARD OR FILM AND A COATED PAPER, PAPERBOARD OR FILM

(71) Applicant: Stora Enso OYJ, Helsinki (FI)

(72) Inventors: Isto Heiskanen, Imatra (FI); Kaj Backfolk, Lappeenranta (FI); Jukka Kankkunen, Imatra (FI); Antti Veitola, Inkeroinen (FI)

(73) Assignee: Stora Enso OYJ, Helsinki (FI)

( * ) Notice: Subject to any disclaimer, the term of this patent is extended or adjusted under 35 U.S.C. 154(b) by 1019 days.

(21) Appl. No.: 17/046,410

(22) PCT Filed: Apr. 12, 2019

(86) PCT No.: PCT/IB2019/053020
§ 371 (c)(1),
(2) Date: Oct. 9, 2020

(87) PCT Pub. No.: WO2019/198040
PCT Pub. Date: Oct. 17, 2019

(65) Prior Publication Data
US 2021/0363701 A1 Nov. 25, 2021

(30) Foreign Application Priority Data
Apr. 12, 2018 (SE) .................... 1850414-2

(51) Int. Cl.
*D21H 19/12* (2006.01)
*B32B 27/10* (2006.01)
(Continued)

(52) U.S. Cl.
CPC ............. *D21H 19/12* (2013.01); *B32B 27/10* (2013.01); *B32B 29/06* (2013.01); *B32B 37/153* (2013.01);
(Continued)

(58) Field of Classification Search
CPC ........ D21H 11/18; D21H 19/12; D21H 23/02; D21H 23/22; D21H 23/52; D21H 23/56;
(Continued)

(56) References Cited

U.S. PATENT DOCUMENTS 2,780,563 A * 2/1957 Frost ...................... D21G 9/009
427/362
10,138,599 B2 11/2018 Aulin et al.
(Continued)

FOREIGN PATENT DOCUMENTS

CN 101952508 A 1/2011
CN 104562854 A 4/2015
(Continued)

OTHER PUBLICATIONS

Meiyun Zhang, Converted paper and Specialty Paper, China Light Industry Press, pp. 124-125, Jan. 31, 2010.
(Continued)

*Primary Examiner* — Dennis R Cordray
(74) *Attorney, Agent, or Firm* — Greer, Burns & Crain, Ltd.

(57) ABSTRACT

The present invention relates to a method for the production of a coated paper, paperboard or film, wherein the method comprises the steps of; providing a first suspension comprising cellulose fibers and/or nanocellulose, applying the first suspension on a substrate to form a fibrous web, wherein the web has a first and a second side, providing a second suspension comprising polymers and/or particles wherein the second suspension has a Brookfield viscosity above 3000 m Pas at a dry content between 4%-40% by weight, providing at least one calender comprising at least one roll or belt, applying the second suspension to the surface of the at least one calender roll or belt forming a coating web and conducting said fibrous web through the at
(Continued)

least one calender whereby the coating web is applied to the first side of the web forming the coated paper, paperboard or film. The invention also relates to a paper, paperboard or film produced according to the method.

16 Claims, 1 Drawing Sheet

(51) Int. Cl.
*B32B 29/06* (2006.01)
*B32B 37/15* (2006.01)
*B32B 37/20* (2006.01)
*D21G 1/00* (2006.01)
*D21H 11/18* (2006.01)
*D21H 19/84* (2006.01)
*D21H 23/56* (2006.01)
*D21H 23/64* (2006.01)

(52) U.S. Cl.
CPC .......... *B32B 37/203* (2013.01); *D21G 1/006* (2013.01); *D21H 11/18* (2013.01); *D21H 19/84* (2013.01); *D21H 23/56* (2013.01); *D21H 23/64* (2013.01); *B32B 2255/12* (2013.01); *B32B 2255/26* (2013.01); *B32B 2307/5825* (2013.01); *B32B 2307/7244* (2013.01); *B32B 2317/12* (2013.01); *B32B 2553/00* (2013.01)

(58) Field of Classification Search
CPC ........ D21H 23/58; D21H 23/60; D21H 23/64; D21G 1/006
See application file for complete search history.

(56) References Cited

U.S. PATENT DOCUMENTS

| | | |
|---|---|---|
| 11,155,111 B2 | 10/2021 | Monnard et al. |
| 2004/0226671 A1 | 11/2004 | Nguyen et al. |
| 2011/0008638 A1 | 1/2011 | Miyawaki et al. |
| 2013/0017349 A1 | 1/2013 | Heiskanen et al. |
| 2015/0225590 A1 | 8/2015 | Iotti |
| 2018/0245289 A1 | 8/2018 | Heiskanen et al. |

FOREIGN PATENT DOCUMENTS

| | | |
|---|---|---|
| CN | 107208378 A | 9/2017 |
| EP | 2492395 A1 | 8/2012 |
| EP | 3219849 A1 | 9/2017 |
| EP | 3461651 A1 | 4/2019 |
| SE | 1551193 A1 | 3/2017 |
| WO | 9967468 | 12/1999 |
| WO | 2010142845 A1 | 12/2010 |
| WO | 2014147295 A1 | 9/2014 |
| WO | 2017046749 A1 | 3/2017 |
| WO | 2017168353 A1 | 10/2017 |
| WO | 2017179717 A1 | 10/2017 |
| WO | 2018002815 A1 | 1/2018 |
| WO | WO 2018/002815 * | 1/2018 |

OTHER PUBLICATIONS

Esa Lehtinen, Pigment Coating and Surface Sizing of Paper, ISBN: 7-5019-4651, 2000, http://www.chlip.com.cn.
Final Office Action from corresponding Japanese application No. 201980025373.5, issued on Jan. 6, 2023.
Office Action from corresponding Japanese application No. 201980025373.5, issued on Jul. 1, 2022.
Scandinavian Pulp, Paper and Board Testing Committee, Brookfield viscosity of slurries, In: SCAN-test methods 1959; [online], chapter 6, pp. 22-33, ETSI TS 101 393 V7.5.0 (Jun. 2000), p. 29, tab. 10.
Boufi, Sami et al., Nanofibrillated celluloose as an additive in papermaking process: A review, Carbohydrate Polymers, 154 (2016), 151-166.
Mohtaschemi, Mikael et al., Rheological characterization of fibrillated cellulose suspensions via bucket vane viscometer, Cellulose (2014) 21: 1305-1312.
Fengel, D., Ultrastructural behaviour of cell wall polysaccharides, TAPPI, 1970, vol. 53, No. 3, pp. 497-503 (Abstract only).
Chinga-Carrasco, Gary, Cellulose fibres, nanofibrils and microfibrils: The morphological sequence of MFC components from a plant physiology and fibre technology point of view, Paper and Fibre Research Institute, Nanoscale Research Letters, 2011, 6:417.
Kumar, Vinay et al., Comparison of nano- and microfibrillated cellulose films, Cellulose, Oct. 2014, vol. 21, Issue 5, pp. 3443-3456 (abstract only).
Lavoine, Nathalie et al., Microfibrillated cellulose—Its barrier properties and applications in cellulosic materials: A review, Carbohydrate Polymers 90 (2012) 735-764.
Aulin, Christian et al., Oxygen and oil barrier properties of microfibrillated cellulose fims and coatings, Cellulose (2010) 17: 559-574.

* cited by examiner

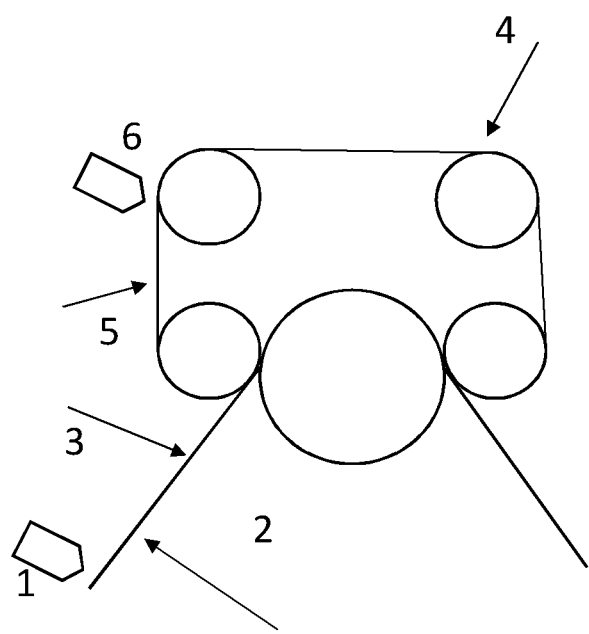

METHOD FOR THE PRODUCTION OF A COATED PAPER, PAPERBOARD OR FILM AND A COATED PAPER, PAPERBOARD OR FILM

This application is a U.S. National Phase under 35 U.S.C. § 371 of International Application No. PCT/IB2019/053020 filed Apr. 12, 2019, which claims priority under 35 U.S.C. §§ 119 and 365 to Swedish Application No. 1850414-2, filed Apr. 12, 2018.

TECHNICAL FIELD

The present invention relates to a method for producing a coated paper, paperboard or film wherein said coating comprises polymers and/or particles. The present invention also relates to a coated paper, paperboard or film produced according to the method.

BACKGROUND

When producing packages from paper, paperboard and making films to be used in connection with packages, it is often important that they have good barrier properties. Depending on the end use of the package different demands of the barrier properties and the package per se is needed.

When applying a coating layer to a paper, paperboard or film in order to improve the barrier properties of the product it is important to control the penetration of the coating layer into the coated product. It is usually not desirable for the coating layer to penetrate too deep into the base product since that increases risks for pinholes or insufficient coverage and might not give the product the desired barrier properties. However, it is preferred that the coating layer partly penetrates and adheres to the product. A coating located too much on the surface without mechanical and physicochemical adhesion will lead to problems with delamination of the product for example during drying or converting of the product.

Furthermore, when applying coating layers the suspensions used often have a low dry content, i.e. large amounts is needed in order to obtain suitable flow behaviors. This is often a problem when coating paper, paperboard or films with polymer coatings e.g. PVOH, CMC or starch or coatings comprising nanocellulose or microfibrillated cellulose. Thus, there is a demand to find a solution where a coating with increased dry content can be added.

When producing sustainable films from renewable resources for packaging applications, it is today possible to produce good barrier films comprising high amounts of microfibrillated cellulose. This is for example described in Aulin et al., Oxygen and oil barrier properties of microfibrillated cellulose films and coatings, Cellulose (2010) 17:559-574, Lavoine et al., Microfibrillated cellulose—Its barrier properties and applications in cellulosic materials: A review, Carbohydrate polymers 90 (2012) 735-764 and Kumar et al., Comparison of nano- and microfibrillated cellulose films, Cellulose (2014) 21:3443-3456.

It is however difficult to produce films, especially thin films, comprising high amounts of microfibrillated cellulose that has both good barrier properties and high strength, especially high tear strength. One potential solution would be to produce a film that comprises both microfibrillated cellulose and longer cellulose fibers. It has however been found that the presence of longer fibers will deteriorate the barrier properties of the film. Also, the microfibrillated cellulose tend to bind strongly to the longer fibers leading to that the fibers are cut (instead of stretched) during tearing conditions which will not improve the tear strength of the film. Furthermore, the cellulose fibers might affect the thickness and variations of the thickness of the film.

There is thus a need to produce a paper, paperboard or film comprising polymers and/or particles such as nanocellulose that has both good barrier and strength properties and that can be produced in an efficient way.

SUMMARY

It is an object of the present invention to provide a method for providing at least one side of a paper, paperboard or film with a coating layer comprising polymer and/or particles, which method eliminates or alleviates at least some of the disadvantages of the prior art methods.

The invention is defined by the appended independent claims. Embodiments are set forth in the appended dependent claims and in the following description.

The present invention relates to a method for the production of a coated paper, paperboard or film, wherein the method comprises the steps of: providing a first suspension comprising cellulose fibers and/or nanocellulose, applying the first suspension on a substrate to form a fibrous web, wherein the web has a first and a second side, providing a second suspension comprising polymer and/or particles wherein the second suspension has a Brookfield viscosity above 3000 mPas, measured according to SCAN-P50:84 at room temperature (23° C.) and at a speed of 10 rpm, at a dry content between 4%-40% by weight, providing at least one calender comprising at least one roll or belt, applying the second suspension to the surface of the at least one roll or belt to form a coating web and conducting said fibrous web through the at least one calender whereby the coating web is applied to the first side of the web forming the coated paper, paperboard or film.

The first suspension preferably comprises between 0.01 weight-% to weight-% of nanocellulose based on total dry weight of the solids of the suspension. When producing a paper or paperboard product the fibrous web may comprise nanocellulose, preferably microfibrillated cellulose to provide the paper or paperboard with improved strength properties.

The first suspension preferably comprises between 70 weight-% to 100 weight-% of nanocellulose based on total dry weight of the solids of the suspension. Thus, a film comprising nanocellulose preferably microfibrillated cellulose is produced comprising high amount of nanocellulose, preferably between 70-100% by weight of nanocellulose, this relates to the amount of nanocellulose in the film per se before eventual coating layers have been added.

The polymer and/or particles of the second suspension is preferably polyvinyl acetate (PVAc), polyvinyl alcohol (PVOH), polyvinyl alcohol-acetate (PVOH/Ac), ethylene vinyl alcohol (EVOH), polyvinylidene chloride (PVDC), guar gum, starch, hemicellulose, cellulose derivatives, latex and/or nanocellulose.

The second suspension preferably comprises 10 weight-% to 100 wt-% of polymers and/or particles, e.g. PVOH, carboxymethyl cellulose, starch and/or nanocellulose, or mixtures or modifications thereof, based on total dry weight of the suspension. It may be preferred that the second suspension comprise between 40-100% by weight of polymers and/or particles based on total dry weight of the suspension, even more preferably between 70-90% by weight of polymers and/or particles based on total dry weight of the suspension. Thus, the coating applied on the fibrous web preferably comprises high amounts of polymers and/or particles. This relates to the amount of polymers and/or particles in the coating per se before eventual additional coating layers have added.

The nanocellulose of the second suspension is preferably a modified nanocellulose. The nanocellulose is preferably a chemically modified nanocellulose such as phosphorylated nanocellulose, cationized nanocellulose, hydrophobically modified nanocellulose, dialdehyde nanocellulose, acetylated nanocellulose, carboxymethylated nanocellulose and/or TEMPO nanocellulose.

The second suspension is preferably applied in an amount leading to that a coating having a grammage of 0.1-20 gsm, preferably between 0.5-10 gsm is formed. It has been found that by adding a thin coating to a paper, paperboard or MFC film the barrier properties of the paper, paperboard or film is improved.

The calender used is preferably a calender with an extended nip. It is preferred to use an extended nip with a calendering zone of at least 20 mm, preferably with a calendering zone of 100-2000 mm.

The calender is a preferably a belt calender. The belt used is preferably a metal belt, a polymer belt or a polymer coated metal belt. The belt might also contain other surface layers such as ceramic coating layers.

The web is preferably calendered at a line load of 0.1-200 MPa, preferably 1-50 MPa, most preferably between 1-10 MPa.

The temperature of the surface of the calender roll or belt is preferably between 40-160° C., preferably between 60-90° C. It might be preferred that the surface of the calender has a temperature low enough to avoid boiling of the suspension on the surface of the calender roll or belt.

The method may further comprise the step of: drying the second suspension on the surface of the calender to a dry content between 10-80% by weight to form the coating web, preferably between 10-50% by weight. The drying may be done by the use of an external heating equipment, e.g. by air heating or radiation curing and or/by heating the surface of the calender. With drying is meant removal of water and thus also including dewatering.

The method according to any of the preceding claims wherein the temperature of the second suspension is above 40° C., preferably above 60° C., preferably between 60-100° C., preferably between 60-90° C. before it is applied to the surface of the calender roll or belt. The method may further comprise the step of dewatering the formed fibrous web to a dry content of 25-95% by weight, preferably between 40-90% by weight, even more preferred between 50-80% by weight before the web is conducted through the calender. It may be important that the dry content of the fibrous web is not too low so that the fibrous web can be conducted through the calender and the addition of the second suspension and formation of the coating layer is possible. If the dry content is too low the fibrous web may break when being conducting through the calender. If the dry content is too high the process is not as cost efficient and the adhesion of the coating layer may be deteriorated.

The method may further comprise the step of applying a surface size, foam coating or a dispersion coating comprising a polymer to any of the sides of the paper, paperboard or film, preferably to the second side of the paper, paperboard or film. By applying a surface size, a foam coating and/or a dispersion coating to the paper, paperboard or film it is possible to improve e.g. the heat-sealing properties and/or water resistance or water and moisture barrier properties of the paper, paperboard or film.

The method may further comprise the step of applying a polymer layer to the second side of the paper, paperboard or film, either through lamination of a polymer film or by extrusion coating of a polymer. By adding a polymer layer a paper, paperboard or film having e.g. heat-sealing properties and/or barrier properties can be produced at a low cost.

The present invention also relates to a coated paper or paperboard obtained by the method described above.

The present invention also relates to a coated film comprising polymers and/or particles obtained by the method described above.

The coated film preferably has a grammage below 45 gsm, preferably below 35, even more preferred below 30 gsm. The film preferably has a density of above 700 kg/cm$^3$. The film preferably has an Oxygen Transmission Rate (OTR) value (23° C., 50% Relative Humidity) below 100 cc/m$^2$*day*atm according to ASTM D-3985, a tear resistance above 2.0 Nm$^2$/g measured as the geometric MD/CD mean value according to ISO 1974 (Elmendorf method) and the first side of the film preferably has a surface roughness PPS value below 10 μm according to ISO 8791-4, preferably below 5 μm, most preferably below 2 μm.

The film according to the present invention is preferably a thin translucent or transparent film, with a high density, high smoothness, good barrier properties and good strength.

DETAILED DESCRIPTION

It has been found that it is possible to produce a coated paper, paperboard or film product having both good barrier properties and good strength properties. The paper, paperboard or film may be provided with a coating in accordance with the present invention. The coating is applied by adding a second suspension comprising polymers and/or particles wherein the second suspension has a Brookfield viscosity above 3000 mPas at a dry content between 4%-40% by weight, to the surface of at least one calender roll or belt. Said second suspension will form a coating web on the surface of the calender roll or belt. The fibrous web is thereafter conducted through the calender in such way that the coating web is added to the fibrous web. An advantage with the present invention is that the dry content of the coating web can be increased compared to if the second suspension was added in the form of a suspension being sprayed or added directly to the fibrous web in any other way. Thus, the amount of water added to the paper, paperboard or film is decreased. By the present invention it is possible to apply suspensions with higher viscosities or higher dry contents compared to methods according to prior art.

Also, the surface of the paper, paperboard or film produced will have improved gloss from the treatment in the calender and the glossy surface will improve both the barrier properties as well as the printing properties of the product. Another advantage with the present invention is that it is much easier to control the penetration of the coating layer into the fibrous web. In this way a more efficient material usage, better quality, less problems with drying induced effects etc is achieved. This is both due to that the dry content of the applied coating web can be increased without deteriorating the barrier properties of the coating web and to that pressure and heat can be applied during the calender treatment. It has thus been found that it is possible to control the penetration of the coating web on the fibrous web to avoid that the coating web is penetrated too much into the fibrous web which will reduce the barrier properties of the product or to that the coating web is located on the surface of the fibrous web, i.e. that too little penetration occurs, which will lead to reduced strength and problems with delamination.

Furthermore, it is possible to increase the production speed for production of a coated paper, paperboard or film according to the invention.

The second suspension has a Brookfield viscosity above 3000 mPas, preferably between 3000-100000 mPas, measured according to SCAN-P50:84 at a dry content between 4%-40% by weight. The viscosity measurement was done at room temperature (23° C.) and at a speed of 10 rpm. The viscosity of the second suspension used when applied to the surface of the roll or belt is determined based on the specific application method used, i.e. the viscosity of the second suspension when applied does not necessarily need to be above 3000 mPas. For example, the dry content of the second suspension can be decreased to reduce the viscosity. However, the second suspension has a viscosity above 3000 mPas at a dry content between 4-40% by weight (at room temperature and 10 rpm).

The polymers of the second suspension are preferably water soluble polymers such as polyvinyl acetate (PVAc), polyvinyl alcohol (PVOH), polyvinyl alcohol acetate (PVOH/Ac), ethylene vinyl alcohol (EVOH), guar gum, starches including modified starches such as dextrin. The polymers of the second suspension may also be non-water-soluble polymers such as polyvinylidene chloride (PVDC) and/or hemicellulose such as xylan or glucomannan. The polymers of the second suspension may also be cellulose derivatives such as carboxymethyl cellulose and/or hydroxyethyl cellulose. The polymer of the second suspension may also be latex such as styrene butadiene copolymers or other copolymers of e.g. acrylates and/or styrenes.

The particle of the second suspension is preferably nanocellulose.

With coating web is meant that a coating, a web or a film or a concentrated suspension (gel-like) is formed on the surface of the calender roll or belt.

It may be possible that the fibrous web is a multilayer fibrous web. It may be possible that the first suspension used for formation of each layer has different compositions, i.e. they may comprise different fibers and/or additives etc in order to produce a multilayer product with the desired properties for each layer. The fibrous web may for example be produced using a multilayer headbox where the first suspensions are applied in more than one layer forming the multilayer fibrous web.

The calender used is preferably a calender with an extended nip. It has surprisingly been found that by using a calender with an extended nip it was possible, in an easy way, to control the calendering treatment in such a way that the penetration of the applied coating web is optimal, i.e. that the web is not penetrated too much into the fibrous web or too little. Furthermore, the gloss, barrier properties as well as the adhesion of the web is improved. Also, if a product with high bulk is improved it is easier to maintain the bulk of the product by the use of the present invention. It is preferred to use an extended nip with a calendering zone of at least 20 mm, preferably with a calendering zone of 100-2000 mm.

The calender is a preferably a belt calender and the belt used is preferably a metal belt, a polymer belt or a polymer coated metal belt. The second suspension is the added to the surface of the belt. The web is preferably calendered at a line load of 0.1-200 MPa, preferably 1-50 MPa, more preferred 1-10 MPa. The optimal line load is chosen based on the substrate, the coating web applied as well as the end use of the product produced. It may also be possible to use a nip pressure profile with one or more pressure peaks, where the nip pressure is for example lower in the beginning of the nip and higher in the end of the nip.

The temperature of the surface of the calender is between 40-160° C., preferably between 60-90° C. The increased temperature makes it possible to both control the dry content of the coating web as well as the gloss of the surface of the product produced.

With surface of the calender roll or belt is meant the surface in contact with the fibrous web in the calender. It can thus be applied directly to the surface of the roll or cylinder of the calender or to the belt.

It may be possible to apply more than one suspension to the surface of the calender roll or belt, i.e. to form a multilayer coating web. This might be done by applying more than one suspension to the surface of the calender roll or belt e.g. by subsequent spraying nozzles. The suspensions used to form the multilayer coating web may be identical or it might be preferred to use different suspensions comprising e.g. different additives in the different layers.

The calender used comprises at least one roll or belt to which the fibrous web is conducted and the calendering treatment is done. The calender preferably comprises at least two rolls and/or belts in between which a nip is formed and the fibrous web is conducted through said nip. The coated paper, paperboard of film may also be coated on the second side with a third suspension. The third suspension may either be applied to a surface of a second roll or belt in the calender or to a surface of a roll or belt in a second calender. The second calender is preferably located directly after the first calender in order to provide the second side of the product with a coating web. Thus, it may be possible to use more than one, e.g. two, three or four calenders in order to apply more than one coating webs onto the fibrous web. In this way a product coated on both sides may be produced. It may also be possible to apply a second coating web in the second calender onto the first coating web/layer in order to provide a multi-layer coating. It may be preferred to use different suspension on each calender, i.e. that the second suspension has a certain content, the third suspension has another etc. In this way it is possible to tailor-made the product and be able to use different additives in the different layers.

The method may further comprise the step of: drying the second suspension on the surface of the calender to a dry content between 10-50% by weight to form the coating web. The drying may be done by the use of an external heating equipment, e.g. by air heating or radiation heating/curing or by heating the surface of the calender.

The method according to any of the preceding claims wherein the temperature of the second suspension is above 40° C., preferably above 60° C., preferably between 60-90° C. before it is applied to the surface of the calender roll or belt. It been found that by increasing the temperature of the second suspension before it is applied to the surface of the calender roll or belt, the drying of the suspension and the formation of the coating web is facilitated and done in a much faster way.

It may also be possible to de-aerate the second suspension before addition to the surface of the calender roll or belt. The presence of air bubbles in the second suspension may cause pin holes in the formed coating web which will deteriorate the barrier properties of the coating on the paper, paperboard or film.

The method may further comprise the step of dewatering the formed fibrous web to a dry content of 25-95% by weight, preferably between 40-90% by weight, even more preferred between 50-80% by weight before the web is conducted through the calender. It may be important that the dry content of the fibrous web is not too low so that the fibrous web can be conducted through the calender and the addition of the second suspension and formation of the coating layer is possible. If the dry content is too low the fibrous web may break when being conducting through the calender. If the dry content is too high the process is not cost efficient and the adhesion of the coating layer may be deteriorated. The dewatering may be done in any known way. Dewatering may for example be done on a wire or in e.g. a press section or by applying heat or radiation curing in any known way. Thus, drying is also included in dewatering and any known drying equipment may be used to achieve the desired dry content of the web. It may also be possible to add moisture to the fibrous web in order to control the dry content of the web. It may be preferred to add steam to the fibrous web in connection to the treatment in the calender, i.e. either before or during the treatment of the fibrous web in the calender. The added steam might then be used both to increase the moisture content of the web and also to increase the temperature of the fibrous web.

The fibrous web is formed by applying the first suspension onto a substrate. The substrate may be a porous wire in a paper making machine. It is thus possible to apply the method in the wet-end of a paper making machine. The formed fibrous web may then be conducted through the calender on the wire or it can be removed from the wire and thereafter conducted through the calender, preferably on the substrate. Any kind of treatment of the fibrous web prior to the treatment in the calender can be done, e.g. dewatering or drying for example in a press section in order for the fibrous web to achieve the desired properties before treatment in the calender. With paper making machine is meant any kind of paper making machine known to a person skilled in the art used for making paper, paperboard, tissue or any similar products.

The substrate may also be a polymer or metal substrate. The fibrous web is then preferably casted onto the polymer or metal substrate. The casted fibrous web can then be dried in any conventional manner and thereafter peeled off from the substrate. The peeled off fibrous web is thereafter conducted through the calender according to the present invention. It may also be possible to conduct the casted fibrous web through the calender on the support on which it has been casted.

The second suspension is added to the surface of the calender roll or belt, i.e. to the surface of a cylinder or belt of the calender. The second suspension is added by contact or non-contact coating methods such as spraying. The coating may also be added by any known way and thereafter being leveled on the surface by suitable equipment, such as a doctor blade. The added second suspension forms an even coating web on the surface of the calender roll or belt. The added second suspension is which form the coating web is thereafter applied to the first side of the fibrous web and the coated fibrous web is thereafter treated in the calender when passing through the calender.

The dry content of the second suspension being added to the surface of the calender roll or belt is preferably between 0.5-30% by weight, preferably between 1-10% by weight. The dry content of the added second suspension may then be increased by drying the suspension on the surface of the calender roll or belt. The drying of the second suspension on the surface of the calender roll or belt may be done by the use of external heating, e.g. by the use of heated air or other solutions known to a person skilled in the art. It may also be possible to heat the surface of the calender roll or belt and in this way dry the second suspension to form the coating web. The dry content of the formed coating web is preferably between 5-80% by weight, preferably between 10-60% by weight and even more preferred between 15-40% by weight before it is applied to the fibrous web.

The surface of the calender roll or belt will be in contact with the first side of the fibrous web, meaning indirect contact since the formed coating web will be located between the first side of the fibrous web and the surface of the calender roll or belt.

The optical properties, such as the gloss of the paper, paperboard or film, are also improved. This could be visually seen after treating the paper, paperboard or film in the calender.

With paper or paperboard is meant any kind of paper or paperboard product. The paper or paperboard comprises cellulose fibers. Any kind of cellulose fibers can be used, i.e. both hardwood and/or softwood fibers can be used. The cellulose fibers can made from any kind of pulp fibers, e.g. chemical pulp fibers such as kraft pulp fibers, dissolving pulp, mechanical pulp fibers and/or thermomechanical pulp fiber, NSSC, or deinked, or recycled pulp.

With film is meant a thin substrate with good gas, aroma or grease or oil barrier properties, preferably oxygen barrier properties. The coated film preferably has a basis weight of less than 40 g/m$^2$ and a density in the range from 700-1400 kg/m$^3$. The oxygen transmission rate (OTR) value of a coated film having a grammage of 30 g/m$^2$ at 23° C. and a relative humidity of 50%, is preferably below 30 cc/m$^2$*day*atm according to ASTM D-3985.

The first suspension preferably comprises between 0.01 weight-% to weight-% of nanocellulose based on total dry weight of the solids of the suspension. When producing a paper or paperboard product the fibrous web may comprise nanocellulose to provide the paper or paperboard with improved strength properties. It may be preferred that the nanocellulose is microfibrillated cellulose. It is preferred that the first suspension when producing a coated paper or paperboard product also comprises other cellulose fibers than nanocellulose. It is preferred that the first suspension comprises 80-99 weight-% of cellulose fibers based on the total dry weight of the solids of the suspension (besides the nanocellulose added). It is preferred that the first suspension comprises 90-100 weight-% of cellulose fibers based on the total dry weight of the solids of the suspension including nanocellulose.

When producing a film is it preferred that the first suspension comprises high amounts of nanocellulose even more preferred microfibrillated cellulose. It is thus possible to produce a film comprising only nanocellulose, i.e. without the presence of any other cellulose fibers. The first suspension preferably comprises between 70 weight-% to 100 weight-% of nanocellulose based on total dry weight of the suspension. Thus, the nanocellulose film produced comprises high amount of nanocellulose, preferably between 70-100% by weight of nanocellulose, this relates to the amount of nanocellulose in the film per se before eventual coating layers have been added.

The nanocellulose in the first and second suspensions are preferably microfibrillated cellulose (MFC). The nanocellulose cellulose of the first suspension preferably has a Schopper-Riegler (SR) value below 90, preferably between 60-90 or even more preferred between 70-85. Preferably at least 50% of the nanocellulose of the first suspension has a SR value below 90, more preferred more than 75% or even more preferred more than 85% of the nanocellulose. Preferably at least 50% of the nanocellulose of the first suspension has a SR value between 70-85, more preferred more than 75% or even more preferred more than 85% of the nanocellulose. The Schopper-Riegler value can be obtained through the standard method defined in EN ISO 5267-1. Thus, the nanocellulose of the first suspension is preferably coarser which will improve the dewatering of the fibrous web. The first suspension may also comprise nanocellulose having a Schopper-Riegler (SR) value above 90. The first suspension may also comprise longer cellulose fibers, either hardwood or softwood fibers, preferably kraft pulp softwood fibers. The first suspension may also comprise other additives, such as retention chemicals, pigments, sodium carboxymethylcellulose (CMC), retention chemicals, fixatives, colloidal silica (retention chemical), defoamers, wet or dry strength agents, starch etc.

The second suspension preferably comprises between 10 weight-% to 100 weight-% of polymers and/or particles based on total dry weight of the suspension, preferably between 40-100 weight-% and even more preferred between 70-90 weight-%. Thus, it might be preferred that the coating layer of the paper, paperboard or film produced comprises high amount of polymers and/or particles, this relates to the amount of polymers and/or particles in the coating layer per se before eventual additional coating layers have been added.

The nanocellulose of the second suspension preferably has a Schopper Riegler (SR) above 85, preferably above 90. Preferably at least 50% of the nanocellulose of the second suspension has a SR value above 85, more preferred more than 75% or even more preferred more than 85% of the nanocellulose. Thus, the second suspension comprises nanocellulose that is very fine. The Schopper Riegler value can be obtained through the standard method defined in EN ISO 5267-1. The second suspension may also comprise other additives, such as pigments, carboxymethyl cellulose (CMC), starch, optical brightening agents, dyes, lubricants, hydrophobic agents, wet or dry strength additives, bioactive chemicals, dispersants, etc.

The second suspension is preferably applied in an amount forming a coating with a grammage of 0.1-20 gsm, preferably between 0.5-10 gsm. The formed coating on the paper, paperboard or film is very thin. It has been found that by adding a thin coating to a paper, paperboard or film the barrier properties of the paper, paperboard or film is improved. The thickness of the formed coating can be determined from cross section image analysis of the formed product according to methods well known to a person skilled in the art. It is also possible to estimate the weight of the coating by analyzing the transfer efficiency during the coating step, i.e. the amount of the surface of the calender roll or belt before and after coating. This can be done by various methods, e.g. by optical or spectroscopic means.

The dry content of the web conducted to the calender is preferably between 40-95% by weight, more preferably between 50-85% by weight. The web formed on the wire may thus be dried or dewatered in any conventional way, e.g. by pressing or conventional cylinder drying, by using vacuum and/or by the use of hot air, in order for it to have the appropriate dry content before it is being conducted to the calender.

The dry content of the produced coated paper, paperboard or film after being conducted through the calender is preferably above 70% by weight, even more preferably above 80% by weight, preferably between 85-97% by weight. The produced coated paper, paperboard or film may also be dried in additional drying steps after being calender. Any conventional drying equipment may be used. If additional layers such as polymer or metal layer were to be added to the coated paper, paperboard or film the dry content of the paper, paperboard or film is of great importance.

By nanocellulose is meant any one of microfibrillated cellulose (MFC) and/or nanocrystalline cellulose.

It may be preferred that the nanocellulose used in the second suspension is modified. Modified nanocellulose will have different properties depending on the modification. Consequently, by using different modified nanocellulose it is possible to give the product different properties. Thus, depending on the end use of the product it might be advantageous to use a modified nanocellulose with the suitable property. The nanocellulose is preferably a chemically modified nanocellulose such as phosphorylated nanocellulose, cationized nanocellulose, hydrophobically modified nanocellulose, dialdehyde nanocellulose, acetylated nanocellulose, carboxymethylated nanocellulose and/or TEMPO nanocellulose.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., Cellulose fibres, nanofibrils and microfibrils: The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemithermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

The first and/or second suspension may also comprise a wet strength agent, i.e. a wet strength agent may be added to the suspension. Wet strength chemicals improve the strength properties of the web and thus of the paper, paperboard or film by crosslinking the microfibrillated. Different wet strength agents can be added such as ureaformaldehyde (UH), melamineformaldehyde (MF), polyamide-epichlorohydrin (PEA), glyoxal and/or polyacrylamide (PAM), or mixtures thereof.

The first and/or second suspension may also comprise a crosslinking agent. By adding a crosslinking agent to the first suspension the paper, paperboard or film will have improved barrier properties at high relative humidity (RH) values. Different crosslinking agents can be added such as citric acid, polyisocyanate, metal ions preferably alkaline earth metal ions, anionic-cationic complex and/or polyelectrolye complex.

The method according to the invention may further comprise the step of applying a surface size, a foam coating and/or a dispersion coating comprising a polymer to one side of the paper, paperboard or film, preferably to the second side of the paper, paperboard or film. The applied coatings, e.g. surface size, foam coating or dispersion coating makes it possible to produce a paper, paperboard or film with improved barrier properties. The paper, paperboard or film comprising a surface size, a foam coating or a dispersion coating can have improved heat-sealing properties and/or water resistance and moisture barrier properties. The polymer of the surface size, foam coating or dispersion coating is preferably a thermoplastic polymer such as polyethylene (PE), ethylene copolymers, acrylate based binders such as methacrylate based binders, styrene based binders e.g. styrene-olefin copolymers, vinyl based binders, e.g. PVCor PVcD. The coating may also comprise additives that will further improve the heat sealability properties. Example of additives in the coating are waxes, antislip agents (e.g. PE waxes, carnauba waxes), inorganic fillers or pigments for antiblock, for haptic/optical, for viscosity control e.g. silica, talc, PCC, anti-oxidants, UV stabilizers, optical brightening agents (OBA), antifoaming agents and/or adhesion promoters. The coating is preferably added in a single step to form a single layer coating but it could also be added in more than one layer to form a multi-layer coating.

The method according to the invention may further comprise the step of applying a polymer layer to the side of the paper, paperboard or film that has not been in direct contact with the calender, i.e. the second side of the paper, paperboard or film, either through lamination of a polymer film or by extrusion coating of a polymer. The addition of a polymer layer makes it possible to produce a paper, paperboard or film with good barrier properties with heat-sealing properties at a low cost. The polymer is preferably a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

The present invention also relates to a coated paper or paperboard product obtained by the method described above.

The present invention also relates to a coated film comprising polymers and/or particles obtained by the method described above.

The coated film preferably has a grammage below 45 gsm, preferably below 35 gsm or even more preferably below 30 gsm. It is preferred that the grammage of the film is between 10-40 gsm, even more preferably between 10-30 gsm.

The density of the coated film is above preferably above 700 g/m$^3$, preferably between 700-1400 g/m$^3$.

The coated film preferably has an Oxygen Transmission Rate (OTR) value (23° C., 50% RH) below 100 cc/m$^2$*day*atm according to ASTM D-3985. Thus, the MFC film produced has very good oxygen barrier properties.

The coated film has preferably a tear resistance above 2.0 Nm$^2$/g measured as the geometric MD/CD mean value according to ISO 1974 (Elmendorf method).

The first side of the coated film preferably has a surface roughness PPS value below 10 μm according to ISO 8791-4, even more preferably below 5 μm and most preferred below 2 μm. It has been found that it is possible to produce a film having a very smooth surface by the present invention. If a metal layer, such an aluminum layer should be attached to the film, the surface smoothness is of great importance. Consequently, the film according to the present invention is suitable to applying metal layers to the first surface of the film.

The film according to the present invention may be used as bag in boxes when packaging dry food such as cereals, as a wrapping substrate, as a laminate material in paper, paperboard or plastics and/or as a substrate for disposable electronics.

BRIEF DESCRIPTION OF THE FIGURE

FIG. 1: Shows a schematic overview of the process according to the invention.

DETAILED DESCRIPTION OF THE FIGURE

FIG. 1 shows a schematic overview of the process according to the present invention. The first suspension (1) comprising cellulose fibers and/or nanocellulose is conducted to a substrate (2) on which a fibrous web (3) is formed. The substrate (2) is preferably a porous wire of a paper or paperboard machine. The substrate (2) and the fibrous web (3) is conducted through a calender (4). To the surface (5) of the calender belt is a second suspension (6) added. The second suspension is then applied onto the first side of fibrous web (3) which is the side in contact (via the coating web formed by the second suspension) with the calender (4). In this way a coated paper, paperboard or film is produced in a very easy and efficient way.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of a coated paper, paperboard or film, wherein the method comprises the steps of:
   providing a first suspension comprising cellulose fibers, nanocellulose, or a mixture thereof,
   applying the first suspension on a substrate to form a fibrous web, wherein the web has a first side and a second side,
   providing a second suspension comprising polymers, particles, or a mixture thereof, wherein the second suspension has a Brookfield viscosity above 3000 mPas, measured according to SCAN-P50:84 at room temperature (23° C.) and at a speed of 10 rpm, at a dry content between 4%-40% by weight,
   providing at least one calender comprising at least one roll or belt,
   applying the second suspension to a surface of the at least one roll or belt thereby forming a coating web, and
   conducting said fibrous web through the at least one calender whereby the coating web is applied to the first side of the fibrous web forming the coated paper, paperboard or film.

2. The method according to claim 1, wherein the first suspension comprises between 0.01 weight-% to 20 weight-% of nanocellulose based on a total dry weight of the first suspension.

3. The method according to claim 1, wherein the first suspension comprises between 70 weight-% to 100 weight-% of nanocellulose based on a total dry weight of the first suspension.

4. The method according to claim 1, wherein the polymers and the particles of the second suspension are each selected of the group consisting of: polyvinyl acetate (PVAc), polyvinyl alcohol (PVOH), polyvinyl alcohol acetate (PVOH/Ac), ethylene vinyl alcohol (EVOH), polyvinylidene chloride (PVDC), guar gum, hemicellulose, starch, cellulose derivatives, latex, and nanocellulose.

5. The method according to claim 1, wherein the second suspension comprises between 10 weight-% to 100 wt-% of polymers, particles, or a mixture thereof based on a total dry weight of the suspension.

6. The method according to claim 4, wherein the nanocellulose of the second suspension is a modified nanocellulose.

7. The method according to claim 1, wherein the second suspension is applied in an amount that a coating having a grammage of between 0.1-20 gsm is formed.

8. The method according to claim 1, wherein the method further comprises the step of:
   dewatering the formed fibrous web to a dry content of 25-95 wt-% before the web is conducted through the calender.

9. The method according to claim 1, wherein the calender used is a calender with an extended nip.

10. The method according to claim 8, wherein the calender is a belt calender.

11. The method according to claim 1, wherein the web is calendered at a line load of between 0.1-200 MPa.

12. The method according to claim 1, wherein a temperature of the surface of the roll or belt is between 40-160° C.

13. The method according to claim 1, wherein the method further comprises the step of:
   drying the second suspension on the surface of the roll or belt to a dry content between 10-80% by weight to form the coating web.

14. The method according to claim 1, wherein a temperature of the second suspension is above 40° C.

15. The method according to claim 1, wherein the method further comprises the step of:
   applying a surface size, a foam coating, a dispersion coating comprising a polymer, or a mixture thereof to the second side of the paper, paperboard or film.

16. The method according to claim 1, wherein the method further comprises the step of:
   applying a polymer layer to the second side of the paper, paperboard or film, either through lamination of a polymer film or by extrusion coating of a polymer.

* * * * *